(12) United States Patent
McLaughlin et al.

(10) Patent No.: US 11,976,566 B2
(45) Date of Patent: May 7, 2024

(54) FATIGUE RESISTANT BLADE OUTER AIR SEAL

(71) Applicant: RTX Corporation, Farmington, CT (US)

(72) Inventors: Brian C. McLaughlin, Kennebunk, ME (US); Paul M. Lutjen, Kennebunkport, ME (US); Richard K. Hayford, Cape Neddick, ME (US); Anthony B. Swift, Waterboro, ME (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/115,755

(22) Filed: Feb. 28, 2023

(65) Prior Publication Data

US 2023/0228197 A1 Jul. 20, 2023

Related U.S. Application Data

(62) Division of application No. 16/434,630, filed on Jun. 7, 2019, now Pat. No. 11,619,136.

(51) Int. Cl.
*F01D 5/20* (2006.01)
*F01D 5/18* (2006.01)
*F01D 11/08* (2006.01)

(52) U.S. Cl.
CPC .............. *F01D 5/20* (2013.01); *F01D 5/187* (2013.01)

(58) Field of Classification Search
CPC ... F01D 5/20; F01D 5/14; F01D 5/187; F01D 11/08; F01D 11/24; F01D 11/14; F01D 9/041; F01D 25/14; F01D 25/246; F01D 25/12; F04D 29/164; F04D 29/526; F05D 2240/11; F05D 2240/55; F05D 2240/10; F05D 2260/201; F05D 2260/204; F05D 2260/205; F05D 2260/20
See application file for complete search history.

(56) References Cited

U.S. PATENT DOCUMENTS

2015/0158782 A1    6/2015  Martin
2016/0169016 A1*   6/2016  Blaney .................. F01D 9/065
                                                  415/173.1

(Continued)

FOREIGN PATENT DOCUMENTS

EP      1965030 A2     9/2008
WO    2015108658 A1    7/2015

OTHER PUBLICATIONS

Momhammad Antar, High Speed EDM and Laser Drilling of Aerospace Alloys, 2016, Elsevier, pp. 526-531 (Year: 2016).*

(Continued)

*Primary Examiner* — Eric J Zamora Alvarez
(74) *Attorney, Agent, or Firm* — CANTOR COLBURN LLP

(57) ABSTRACT

A blade outer air seal segment including a radially outward surface, a radially inward surface oriented away from the radially outward surface, and a cooling channel located between the radially outward surface and the radially inward surface. The blade outer air seal segment also including a stress-relief boss extending into the cooling channel and an inlet orifice fluidly coupled to the cooling channel through the stress-relief boss. The blade outer air seal segment further including a stress-relief recess. The stress-relief boss being located within the stress relief recess.

9 Claims, 7 Drawing Sheets

(56) References Cited

U.S. PATENT DOCUMENTS

2017/0204737 A1    7/2017   Varney et al.
2017/0211415 A1    7/2017   Swift et al.
2017/0335707 A1   11/2017   Galle
2019/0218925 A1    7/2019   Garay et al.
2020/0386105 A1   12/2020   McLaughlin et al.

OTHER PUBLICATIONS

Communication pursuant to Article 94(3) dated Nov. 24, 2022; EP Application No. 20178616.7; 7 pages.
European Search Report for Application No. 20178616.7; Date of Completion: Jul. 28, 2020; dated Aug. 6, 2020; 7 Pages.

* cited by examiner

FATIGUE RESISTANT BLADE OUTER AIR SEAL

CROSS REFERENCE TO RELATED APPLICATIONS

This application is a divisional of U.S. patent application Ser. No. 16/434,630 filed on Jun. 7, 2019, the entire contents of which are incorporated herein by reference thereto.

BACKGROUND

The subject matter disclosed herein generally relates to gas turbine engines and, more particularly, to a blade outer air seal (BOAS) having fatigue resistant cooling inlets and methods of forming the same.

A gas turbine engine generally includes a fan section, a compressor section, a combustor section, and a turbine section. The fan section drives air along a bypass flow path and a core flow path. In general, during operation, air is pressurized in the compressor section and then mixed with fuel and ignited in the combustor section to generate combustion gases. The combustion gases flow through the turbine section, which extracts energy from the combustion gases to power the compressor section and generate thrust.

The blade assemblies of the turbine section generally include a BOAS to reduce flow leakage over the blade tips. The BOAS is subjected to extremely hot combustion gases. To cool the BOAS, cooling air from a secondary air flow system may be provided to internal cooling channels formed within the body of the BOAS. The cooling air may enter the internal cooling channels through inlet holes formed through the BOAS. The inlet holes tend to experience increased fatigue due to the tensile stresses resulting from the temperature difference between the flow-path side of the BOAS and the cooled side of the BOAS (i.e., the side proximate the combustion gases and the side proximate the cooling flow).

SUMMARY

According to an embodiment, a blade outer air seal segment is provided. The blade outer air seal segment including a radially outward surface, a radially inward surface oriented away from the radially outward surface, and a cooling channel located between the radially outward surface and the radially inward surface. The blade outer air seal segment also including a stress-relief boss extending into the cooling channel and an inlet orifice fluidly coupled to the cooling channel through the stress-relief boss. The blade outer air seal segment further including a stress-relief recess. The stress-relief boss being located within the stress relief recess.

In addition to one or more of the features described above, or as an alternative, further embodiments may include that the cooling channel is defined, at least partially, by a radially outward channel surface and a radially inward channel surface. The stress-relief boss extends away from the radially outward channel surface to a surface of the stress-relief boss.

In addition to one or more of the features described above, or as an alternative, further embodiments may include a raised portion of the radially outward surface. The radially outward channel surface is located radially outward of the radially inward channel surface. The inlet orifice extends from the raised portion of the radially outward surface to the surface of the stress-relief boss.

In addition to one or more of the features described above, or as an alternative, further embodiments may include that the surface of the stress-relief boss is about parallel to at least one of the radially inward channel surface and the radially outward channel surface.

In addition to one or more of the features described above, or as an alternative, further embodiments may include that the stress-relief boss extends to a surface of the stress-relief boss. A radial height of the cooling channel between the radially outward channel surface and the radially inward channel surface is greater than a radial height of the cooling channel between the surface of the stress-relief boss and the radially inward channel surface.

In addition to one or more of the features described above, or as an alternative, further embodiments may include that the stress-relief boss is concentric to the inlet orifice.

In addition to one or more of the features described above, or as an alternative, further embodiments may include that the stress-relief boss is concentric to the stress-relief recess.

In addition to one or more of the features described above, or as an alternative, further embodiments may include that the cooling channel is defined, at least partially, by a radially outward channel surface and a radially inward channel surface. The stress-relief recess extends into the radially outward channel surface to a base of the stress-relief recess.

In addition to one or more of the features described above, or as an alternative, further embodiments may include that a radial height of the cooling channel between the radially outward channel surface and the radially inward channel surface is less than a radial height of the cooling channel between the base of the stress-relief recess and the radially inward channel surface.

According to another embodiment, a turbine section of a gas turbine engine is provided. The turbine section including: a blade configured to rotate about an axis and a blade outer air seal segment radially outward of the blade. The blade outer air seal segment including a radially outward surface, a radially inward surface oriented away from the radially outward surface, and a cooling channel located between the radially outward surface and the radially inward surface. The blade outer air seal segment also including a stress-relief boss extending into the cooling channel and an inlet orifice fluidly coupled to the cooling channel through the stress-relief boss. The blade outer air seal segment further including a stress-relief recess. The stress-relief boss being located within the stress relief recess.

In addition to one or more of the features described above, or as an alternative, further embodiments may include that the cooling channel is defined, at least partially, by a radially outward channel surface and a radially inward channel surface; and wherein the stress-relief boss extends away from the radially outward channel surface to a surface of the stress-relief boss.

In addition to one or more of the features described above, or as an alternative, further embodiments may include a raised portion of the radially outward surface. The radially outward channel surface is located radially outward of the radially inward channel surface. The inlet orifice extends from the raised portion of the radially outward surface to the surface of the stress-relief boss.

In addition to one or more of the features described above, or as an alternative, further embodiments may include that the surface of the stress-relief boss is about parallel to at least one of the radially inward channel surface and the radially outward channel surface.

In addition to one or more of the features described above, or as an alternative, further embodiments may include that the stress-relief boss extends to a surface of the stress-relief boss. A radial height of the cooling channel between the radially outward channel surface and the radially inward channel surface is greater than a radial height of the cooling channel between the surface of the stress-relief boss and the radially inward channel surface.

In addition to one or more of the features described above, or as an alternative, further embodiments may include that the stress-relief boss is concentric to the inlet orifice.

In addition to one or more of the features described above, or as an alternative, further embodiments may include that the stress-relief boss is concentric to the stress-relief recess.

In addition to one or more of the features described above, or as an alternative, further embodiments may include that the cooling channel is defined, at least partially, by a radially outward channel surface and a radially inward channel surface. The stress-relief recess extends into the radially outward channel surface to a base of the stress-relief recess.

In addition to one or more of the features described above, or as an alternative, further embodiments may include that a radial height of the cooling channel between the radially outward channel surface and the radially inward channel surface is less than a radial height of the cooling channel between the base of the stress-relief recess and the radially inward channel surface.

According to another embodiment, a method of forming a blade outer air seal segment is provided. The method including that a blade outer air seal material is deposited around a core. The core being configured to form a cooling channel in the blade outer air seal segment. The core includes a raised section and a recess within the raised section. A thickness of the core at the recess is less than a thickness of a channel portion of the core and a thickness of the core at the raised section is greater than the thickness of the channel portion of the core. The method also including that an inlet orifice is formed through the blade outer air seal material in a location of the recess.

In addition to one or more of the features described above, or as an alternative, further embodiments may include that forming the inlet orifice includes using electrical discharge machining to form the inlet orifice.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

Figure 5:
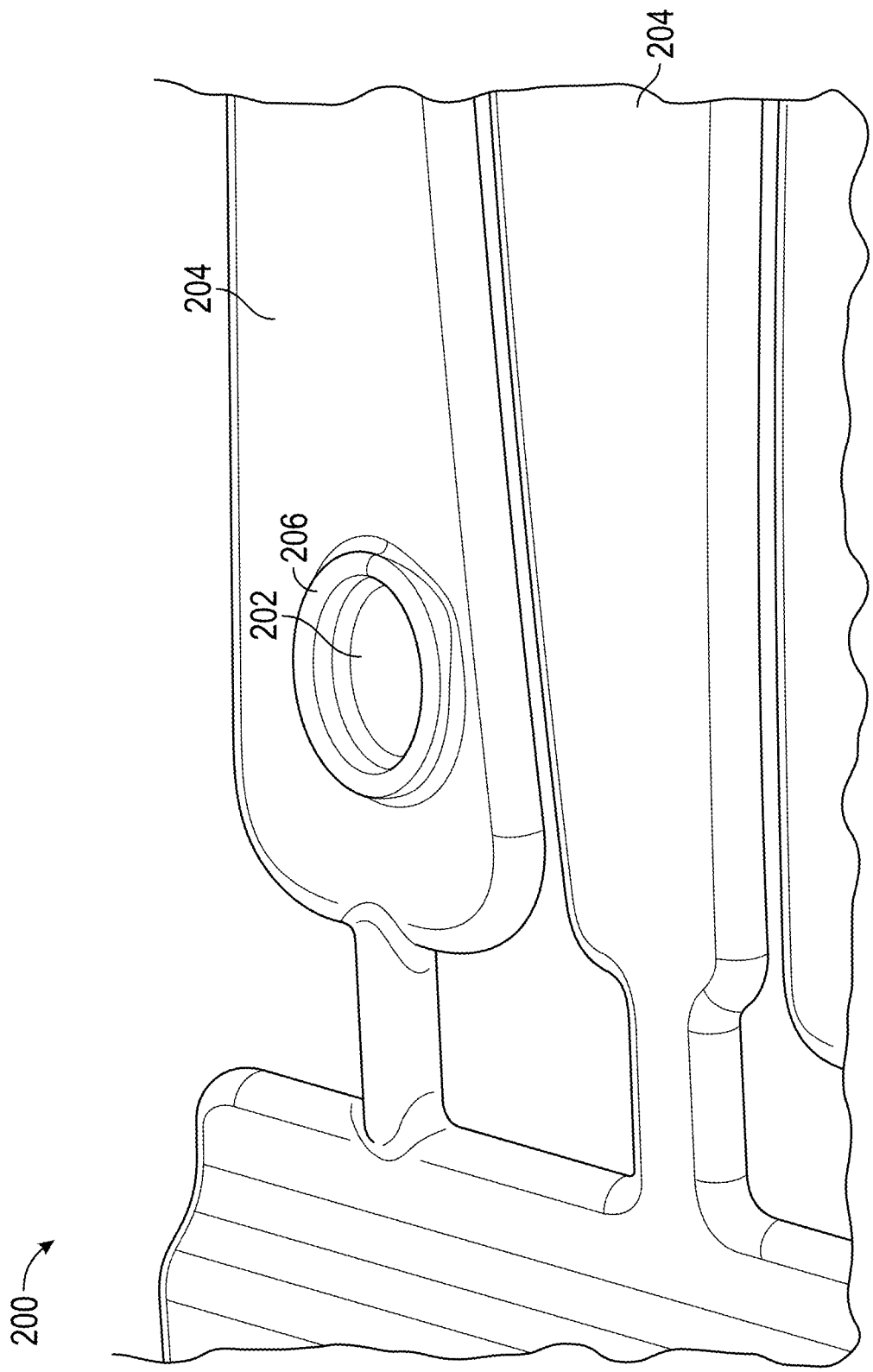
Figure 6:
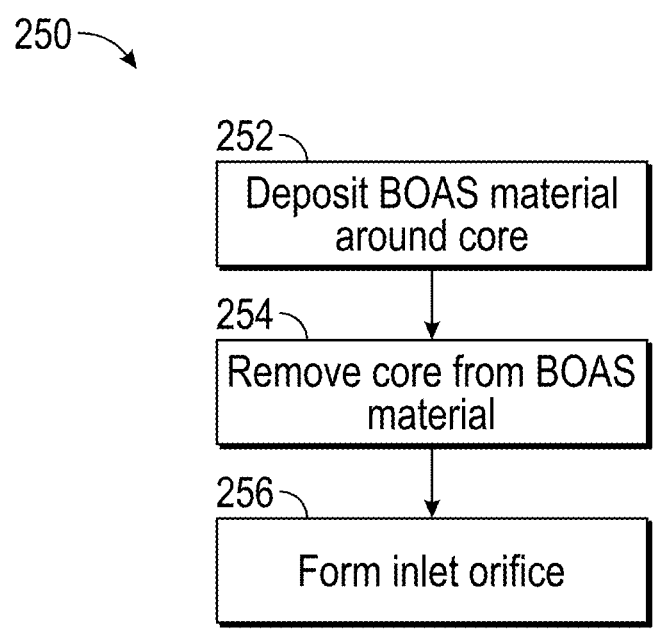

FIG. 5 illustrates a perspective view of core configured to form a BOAS cooling channels and having a stress-relief boss corresponding to an inlet orifice location and a stress-relief recess encircling the stress-relief boss, in accordance with an embodiment of the present disclosure; and FIG. 6 illustrates a method of making a BOAS segment having a fatigue resistant inlet orifice, in accordance with an embodiment of the present disclosure.

The detailed description explains embodiments of the present disclosure, together with advantages and features, by way of example with reference to the drawings.

DETAILED DESCRIPTION

A detailed description of one or more embodiments of the disclosed apparatus and method are presented herein by way of exemplification and not limitation with reference to the Figures.

Figure 1:
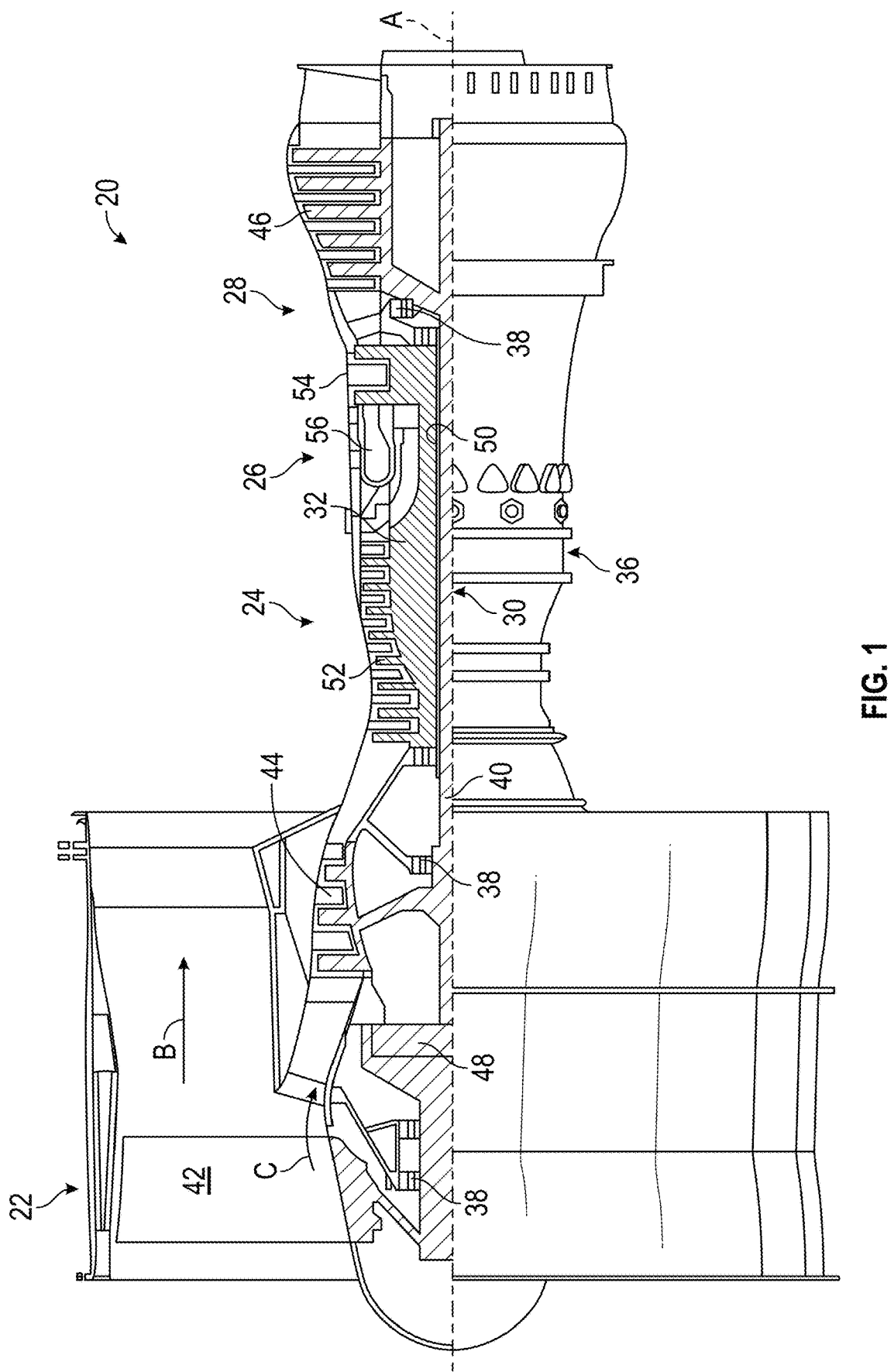
FIG. 1 is a partial cross-sectional illustration of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 m/sec).

Figure 2:
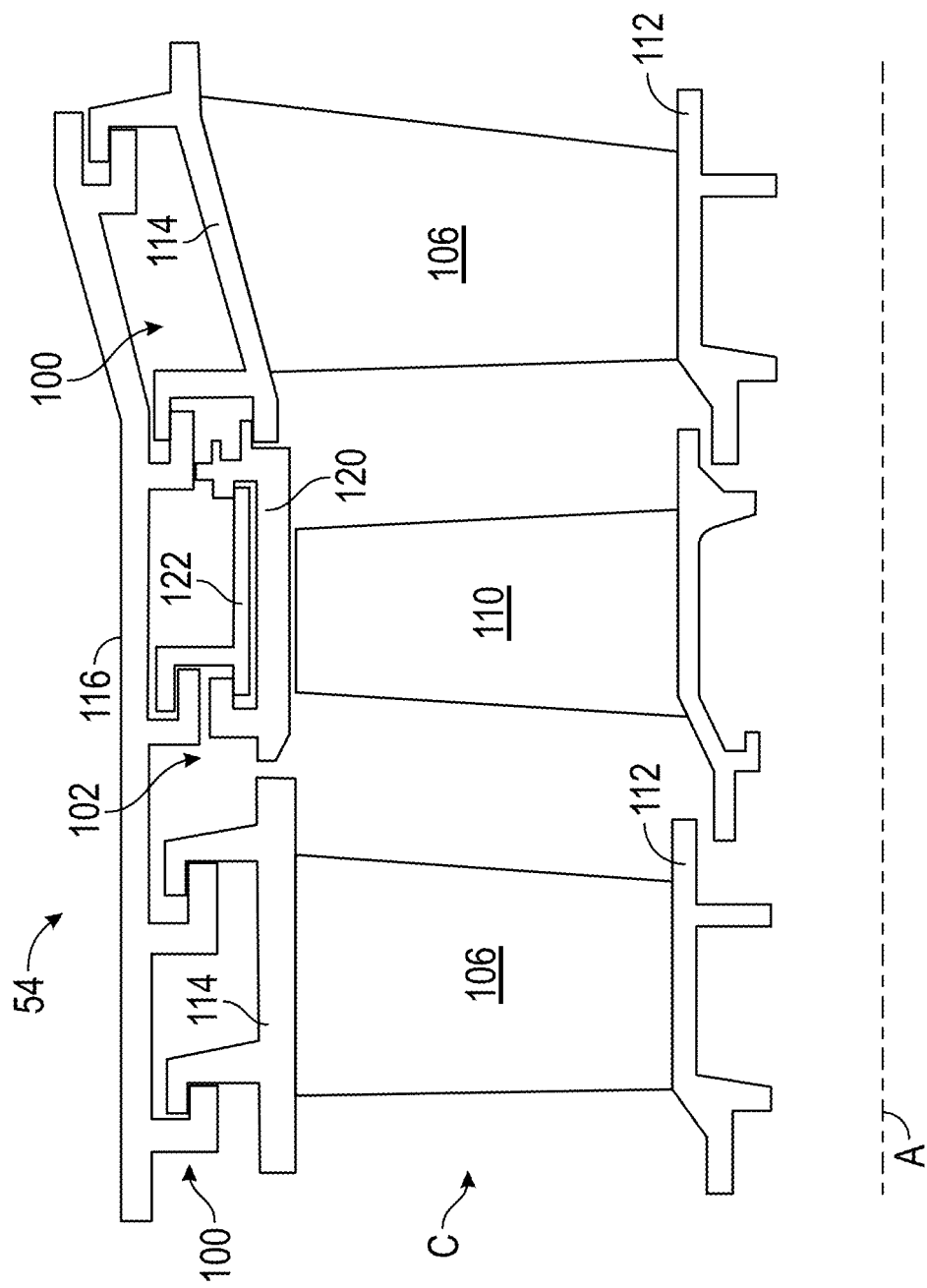
FIG. 2 illustrates a schematic cross-section of a portion of a high pressure turbine section of the gas turbine engine of FIG. 1, in accordance with an embodiment of the present disclosure.

Referring now to FIG. 2, with continued reference to FIG. 1, a portion of the high pressure turbine 54 is illustrated, in accordance with an embodiment of the present disclosure. The high pressure turbine 54 may include vane assemblies 100 and blade assemblies 102 (one shown) axially interspersed with the vane assemblies 100. The vane assemblies 100 do not rotate and the blade assemblies 102 rotate. The vane assemblies 100 each include a plurality of vanes 106 positioned about the engine central longitudinal axis A. Each of the vanes 106 may extend between an inner vane platform 112 and an outer vane platform 114. The outer vane platform 114 may be configured to couple, or otherwise support attachment of, the vane assemblies 100 to a turbine case structure 116. The turbine case structure 116 may form a portion of the engine static structure 36 illustrated in FIG. 1. The vane assemblies 100 comprise static structures that do not rotate relative to the engine central longitudinal axis A. The vane assemblies 100 may help direct the flow of fluid (i.e., airflow along core flow path C) received by and output from the blade assemblies 102.

The blade assemblies 102 each include a plurality of blades 110 configured for rotation about the engine central longitudinal axis A. For example, the blades 110 may rotate in response to receiving a flow of fluid (e.g., combustion gases) from the combustor 56 of FIG. 1. Power from the flow may be converted to mechanical power, or torque, by the blades 110. The blade assemblies 102 may also include a blade outer air seal 120 (BOAS 120). A blade outer air seal support 122 (BOAS support 122) may couple, or otherwise secure, the BOAS 120 to the turbine case structure 116.

The BOAS 120 is disposed radially outward of the blades 110. The BOAS 120 is configured to provide a seal to reduce or prevent hot gases from leaking over the tips of the blades 110. In various embodiments, the BOAS 120 may be segmented. For example, the BOAS 120 may comprise a plurality of arcuate BOAS segments arranged in circumferential series around the engine central longitudinal axis A.

Figure 3:
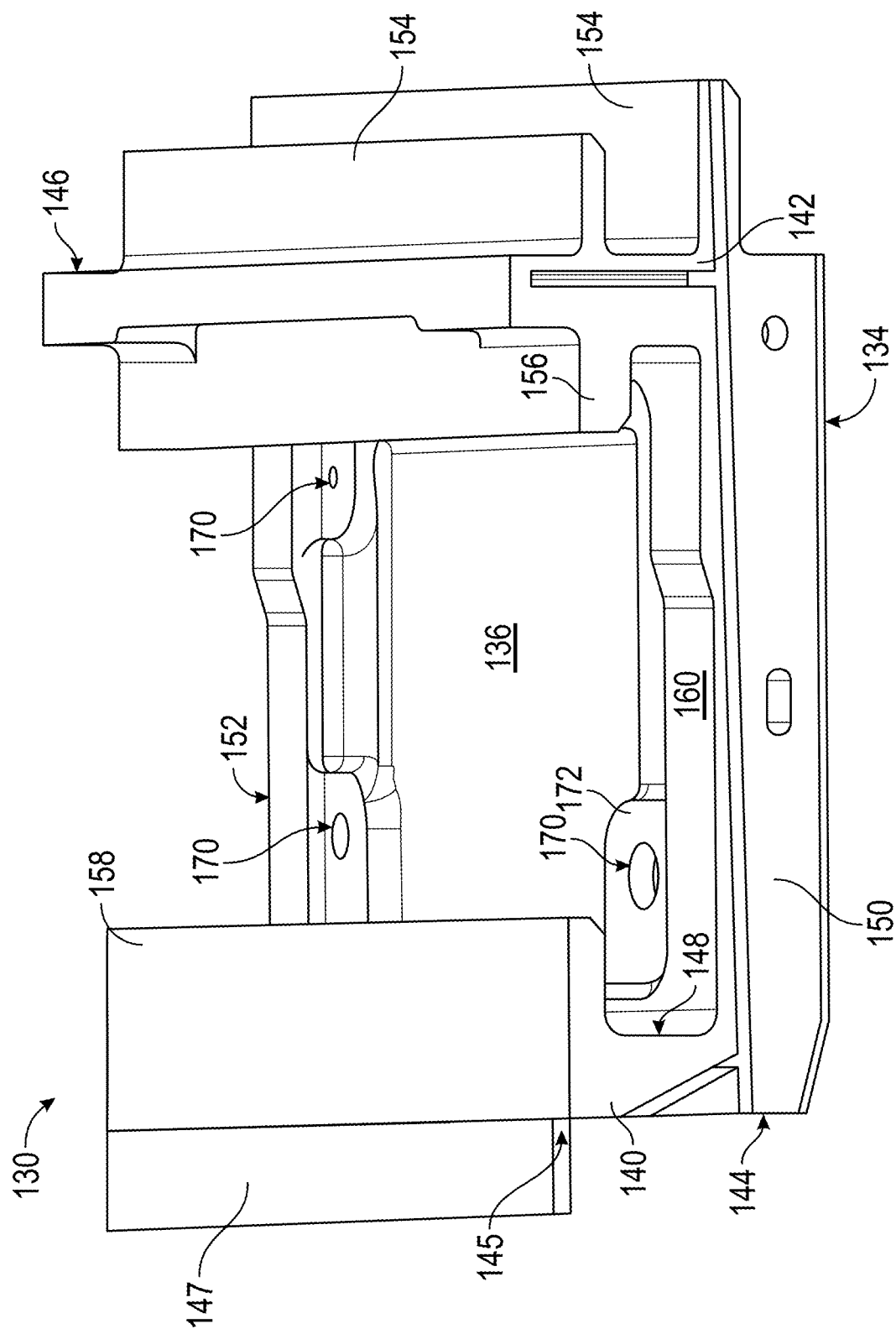
FIG. 3 illustrates a perspective view of a BOAS segment, in accordance with an embodiment of the present disclosure.

Referring now to FIG. 3, with continued reference to FIGS. 1-2, a BOAS segment 130 of the BOAS 120 is illustrated, in accordance with an embodiment of the present disclosure. The BOAS segment 130 includes a radially inward (or first) surface 134 and a radially outward (or second) surface 136. The radially inward surface 134 is oriented away from the radially outward surface 136. When installed in the blade assemblies 102 of FIG. 2, the radially inward surface 134 of the BOAS segments 130 is oriented toward blades 110.

The BOAS segment 130 includes a forward wall 140 and an aft wall 142 opposite the forward wall 140. The forward wall 140 extends in a radially outward direction and may define a forward edge 144 of BOAS segment 130. The aft wall 142 extends in a radially outward direction and may define an aft edge 146 of the BOAS segment 130. In various embodiments, the aft wall 142 may include one or more aftward extending flange(s) 154 and one or more forward extending flange(s) 156. The forward wall 140 may include one or more aftward extending flange(s) 158. The aftward extending flanges 158 may extend aftward from an aftward oriented surface 148 of the forward wall 140. In various embodiments, the forward wall 140 may also or alternatively include one or more forward extending flange(s) 147. The forward extending flange(s) 147 of the forward wall 140 may extend forward from a forward oriented surface 145 of the forward wall 140.

The BOAS segment 130 includes a first circumferential wall 150 and a second circumferential wall 152 opposite the first circumferential wall 150. The first circumferential wall 150 extending from the forward wall 140 to the aft wall 142. The second circumferential wall 152 extending from the forward wall 140 to the aft wall 142. The BOAS segment 130 may be arranged in circumferential series with a plurality of BOAS segments 130 such that the first circumferential wall 150 of a first BOAS segment 130 is circumferentially adjacent to the second circumferential wall 152 of a second BOAS segment 130.

In an embodiment, the BOAS segment 130 includes one or more inlet orifice(s) 170. Stated differently, BOAS segment 130 defines the inlet orifices 170. In various embodiments, inlet orifices 170 are formed in the radially outward portion 136 of the BOAS segment 130. In this regard, the inlet orifices 170 may be formed through radially outward portion 136 of the BOAS segment 130. The inlet orifices 170 may be formed through raised portions 172 of the BOAS segment 130.

Figure 4A:
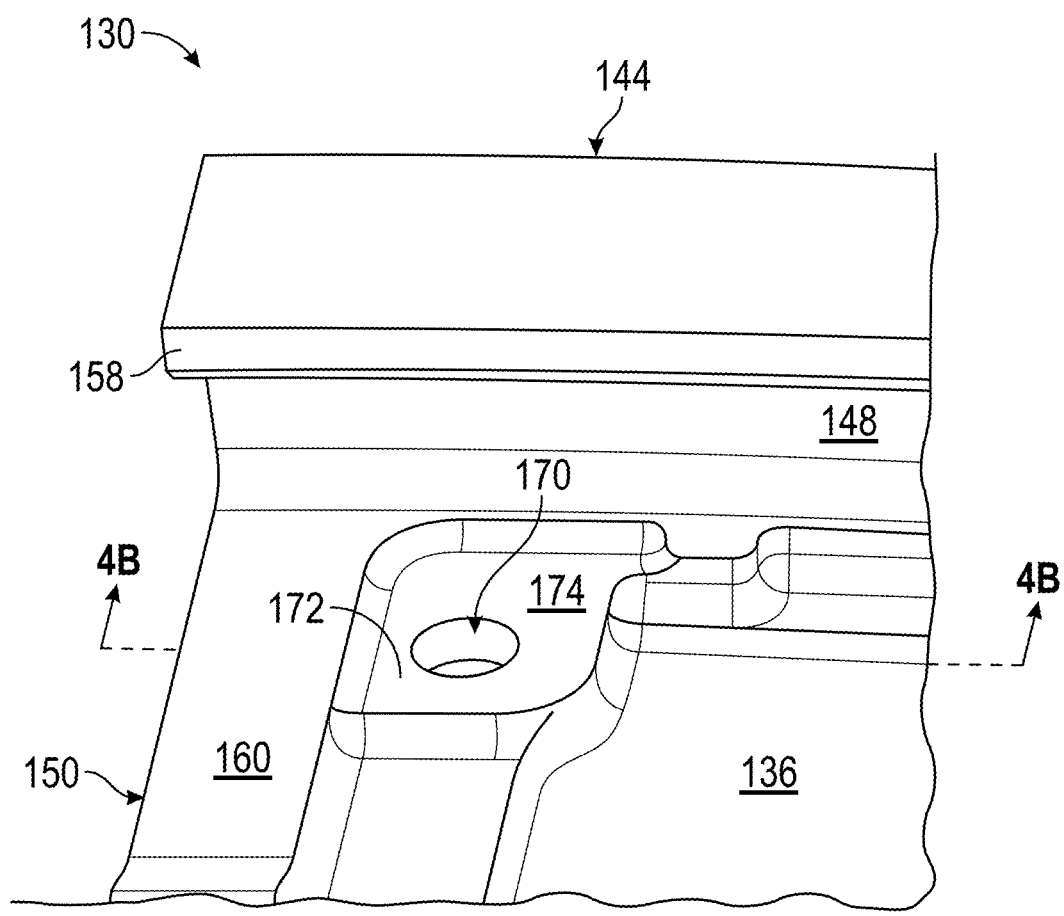
FIG. 4A illustrates a perspective view of an inlet orifice of the BOAS segment of FIG. 3, in accordance with an embodiment of the present disclosure.
Figure 4B:
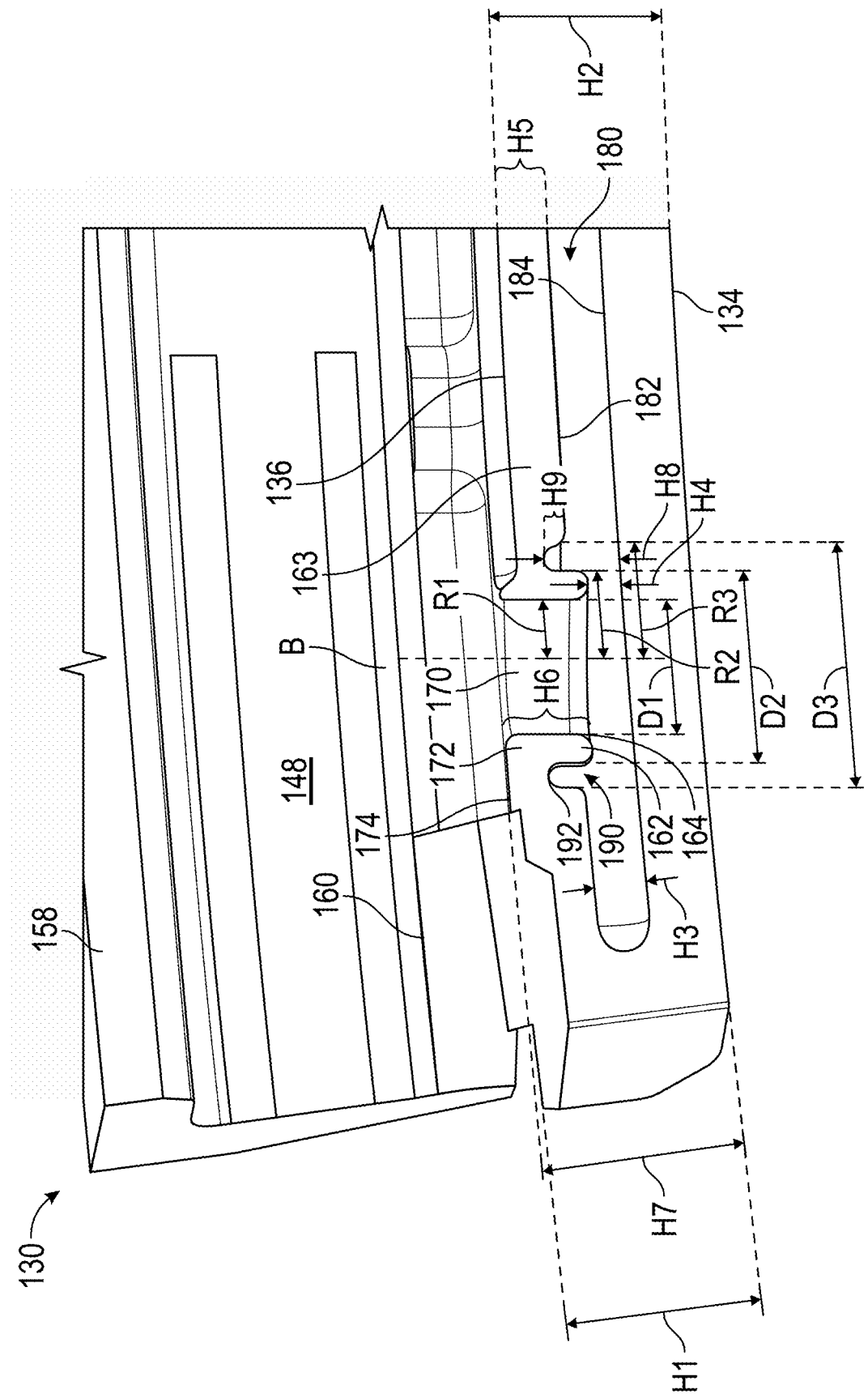
FIG. 4B illustrates a cross-section view of the inlet orifice of FIG. 4A taken along the line 4B-4B in FIG. 4A, in accordance with an embodiment of the present disclosure.

Referring now to FIGS. 4A and 4B, with continued reference to FIGS. 1-3, additional details of the inlet orifice 170 formed through the radially outward portion 136 of the BOAS segment 130 are illustrated, in accordance with an embodiment of the present disclosure.

The inlet orifices 170 formed through the raised portion 172 of the BOAS segment 130 are illustrated, in accordance with various embodiments. A radial height, or thickness, H7 of the BOAS segment 130 at the raised portion 172 is greater than the radial height H2 of the BOAS segment 130 at the radially outward surface 136. The radial height H7 is measured between the radially inward surface 134 of the BOAS segment 130 and the surface 174 of the raised portion 172. The surface 174 of the raised portion 172 is oriented opposite, or generally away from, radially the inward surface 134. In various embodiments, the radial height H7 of the BOAS segment 130 at the raised portion 172 is less than the radial height H1 of BOAS segment 130 at the first circumferential wall 150.

A radial height, or thickness, H1 of the BOAS segment 130 at the first circumferential wall 150 is equal to or greater than a radial height, or thickness, H2 of the BOAS segment 130 at the radially outward surface 136. The radial height H1 is measured between the radially inward surface 134 of the BOAS segment 130 and the surface 160 of the first circumferential wall 150. The surface 160 of the first circumferential wall 150 is oriented opposite, or generally away from, the radially inward surface 134. The radial height H2 is measured between the radially inward surface 134 and the radially outward surface 136 of the BOAS segment 130. In an embodiment, the second circumferential wall 152 includes a radial height equal to the radial height H1 of first circumferential wall 150.

The BOAS segment 130 defines one or more internal cooling channel(s) 180. The cooling channels 180 may form a cooling circuit through the BOAS segment 130. Cooling airflow in the space over (i.e., radially outward from) radially outward surface 136 may be provided to the cooling channels 180 through the inlet orifices 170. Stated differently, cooling airflow may flow through the inlet orifice 170 and into the cooling channel 180.

The cooling channel 180 is enclosed within the BOAS segment 130 between the radially outward surface 136 and the radially inward surface 134. The cooling channel 180 may be defined, at least partially, by a radially outward channel surface 182 and a radially inward channel surface 184 opposite the radially outward channel surface 182. The radially outward channel surface 182 is located radially outward of the radially inward channel surface 184. The radially outward channel surface 182 may be located at a radial height H3 away from the radially inward channel surface 184. Stated differently, the radial height H3 is a height or thickness of the cooling channel 180.

A stress-relief boss 162 extends into the cooling channel 180. The stress-relief boss 162 extends to a surface 164, as shown in FIG. 4B. The inlet orifice 170 extends from the surface 174 of the raised portion 172 to the surface 164 of the stress-relief boss 162. In an embodiment, the surface 164 of the stress-relief boss 162 may be about parallel with at least one of the radially inward channel surface 184 and the radially outward channel surface 182. The stress-relief boss 162 may be formed on the radially outward channel surface 182. The stress-relief boss 162 extends away from the radially outward channel surface 182 into the cooling channel 180 and towards the radially inward channel surface 184. The stress-relief boss 162 is located proximate the inlet orifice 170. In an embodiment, the inlet orifice 170 may be formed through the stress-relief boss 162 of BOAS segment 130. The inlet orifices 170 are fluidly coupled to cooling channels 180. In an embodiment, the inlet orifice 170 is fluidly coupled to the cooling channel 180 through the stress-relief boss 162.

The radial height H3, H4, H8 of the cooling channel 180 decreases proximate the stress-relief boss 162. Stated differently, the radial height H3 of the cooling channel between the radially outward channel surface 182 and the radially inward channel surface 184 is greater than the radial height H4 of the cooling channel between a surface 164 of the stress-relief boss 162 and the radially inward channel surface 184.

The BOAS segment 130 includes a radially outward wall 163 interposed between the radially outward surface 136 and radially outward channel surface 182. The radially outward wall 163 also extends between the radially outward surface 136 and a surface 164 of the stress-relief boss 162. A thickness H6 of the radially outward wall 163 between the radially outward surface 136 and a surface 164 of the stress-relief boss 162 is greater than a thickness H5 of the radially outward wall 163 between the radially outward surface 136 and radially outward channel surface 182. In other words a thickness of the radially outward wall 163 increases proximate the stress-relief boss 162.

In an embodiment, the BOAS segments 130 includes a stress-relief recess 190. The stress-relief is formed in the radially outward channel surface 184. The stress-relief boss 162 is located within the stress relief recess 190. The stress-relief recess 190 may encircle the stress-relief boss 162, as illustrated in FIG. 4B. The stress-relief recess 190 extends into the radially outward channel surface 182 to a base 192 of the stress-relief recess 190. Stated differently, the stress-relief recess 190 bottoms out at the base 192. The stress-relief recess 190 may extending into the radially outward channel surface 182 a radial height H9, as illustrated in FIG. 4B. The radial height H3, H4, H8 of the cooling channel 180 increases at the stress-relief recess 190. Stated differently, the radial height H3 of the cooling channel between the radially outward channel surface 182 and the radially inward channel surface 184 is less than the radial height H8 of the cooling channel between the base 192 of the stress-relief recess 190 and the radially inward channel surface 184.

In an embodiment, the stress-relief boss 162 may be cylindrically shaped. In this regard, a cross-section of the stress-relief boss 162 taken along a plane generally parallel to the surface 164 may be circular. The inlet orifice 170 may be cylindrically shaped. In this regard, a cross-section of the inlet orifice 170 taken along a plane generally parallel to the surface 164 may be circular. In an embodiment, the stress-relief recess 190 may be cylindrically shaped. In this regard, a cross-section of the stress-relief recess 190 taken along a plane generally parallel to the base 192 may be circular. In various embodiments, a cross-section of the stress-relief boss 162 a cross-section the inlet orifice 170, and/or the stress-relief recess 190 taken along a plane generally parallel to the base 192 may comprise an elliptical, an oval, a rectangular, a polygonal, or any other desired shape.

The stress-relief boss 162 may be concentric to the inlet orifice 170 such that a radius R1 of the inlet office 170 and a radius R2 of the stress-relief boss 162 are measured from the same axis B. A diameter D1 of inlet orifice 170 is less than a diameter D2 of stress-relief boss 162.

The stress-relief recess 190 may be concentric to the inlet orifice 170 and the stress-relief boss 162 such that the radius R1 of the inlet office 170, the radius R2 of the stress-relief boss 162, and a radius R3 of the stress-relief boss 162 are measured from the same axis B. The diameter D1 of the inlet orifice 170 is less than a diameter D2 of the stress-relief boss 162 and the diameter D2 of stress-relief boss 162 is less than a diameter D3 of stress-relief recess 162.

Advantageously, the stress-relief boss 162 and the stress-relief recess 190 tends to shield the inlet orifice 170 from the tensile stress field created by the thermal gradient between the radially inward surface 134 and the radially outward surface 136. The stress-relief boss 162 may be subjected to the tensile stress field, but experiences a lower stress than the inlet orifice 170 alone extending to the radially outward channel surface 182 (i.e., cooling circuits which do not include stress-relief bosses 162 or the stress-relief recess 190). The BOAS segment 130 tends to exhibit improved fatigue capability, which may allow the BOAS 120 to be employed in greater temperatures and/or exposed to increased temperatures for a longer durations of time. Also advantageously, decreasing the radial height (i.e., from H3 to H4) of the cooling channel 180 proximate the inlet orifice 170 improves the impingement coefficient of cooling air flow through the inlet orifice 170 towards the radially inward channel surface 184. Also advantageously, by adding the stress-relief recess 190 the radial height H6 of the stress-relief boss 162 may be reduced, which reduces the impedance of the stress-relief boss 162 on lateral airflow within the cooling channel 180.

Referring now to FIG. 5, with continued reference to FIGS. 1-4A, and 4B, a core 200 configured to form the cooling channels 180 and the stress-relief boss 162 is illustrated, in accordance with an embodiment of the present disclosure. The core 200 may comprise metal, composite, or any other suitable material. In various embodiments, the core 200 may be a ceramic core. The core 200 includes one or more recesses 202. The location of the recess 202 corresponds to the location of the inlet orifice 170 of FIGS. 3, 4A, and 4B. In various embodiments, the location of recesses 202 corresponds to the stress-relief bosses 162 of BOAS segment 130, of FIG. 4. The recesses 202 are formed on the channel portions 204 of the core 200. A thickness of core 200 at recess 202 is less than a thickness of core 200 at channel portion 204. The thickness of core 200 at recess 202 is equal to the radial height H4 in FIG. 4B. The thickness of core 200 at the channel portion 204 is equal to the radial height H6.

In an embodiment, the location of the raised section 206 corresponds to the stress-relief recess 190 of BOAS segment 130, of FIG. 4. The raised section is formed on the channel portions 204 of the core 200. A thickness of core 200 at the raised section is greater than a thickness of core 200 at channel portion 204. The thickness of core 200 at raised section 206 is equal to the radial height H9 in FIG. 4B. The thickness of core 200 at the channel portion 204 is equal to the radial height H6.

Referring now to FIG. 6, with continued reference to FIGS. 1-4A, 4B, and 5, a method 250 of forming a BOAS segment 130 having inlet orifices 170 that are fatigue resistant is illustrated, in accordance with an embodiment of the present disclosure. The method 250 may include the steps of depositing a BOAS material around a core 200 (step 252). The core 200 being configured to form a cooling channel 180 in the BOAS segment 130 and including a raised section 206 and a recess 202 within the raised section 206. The raised section 206 may encircle the recess 206, as illustrated in FIG. 5. A thickness of the core 200 is reduced at the recess 202. A thickness of the core 200 is increased at the raised section 206. The method 250 may further comprise removing the core 200 (step 254). For example, the core 200 may be leached out of the BOAS material forming the BOAS segment 130. The method 250 further comprises forming an inlet orifice 170 through the BOAS segment 130 (step 256). In an embodiment, the inlet orifice 170 is formed within the recess 202.

In various embodiments, step 256 may include forming the inlet orifice using electrical discharge machining (EDM). Using EDM to form the inlet orifices 170 tends to be associated with greater reductions in fatigue capability, as compared to milling or drilling the inlet orifices 170. In various embodiments, step 256 may include forming the inlet orifice 170 using milling, drilling, or any other suitable technique.

While the inlet orifices 170 and method 250 are described in relation to a BOAS segment 130, it is further contemplated and understood that the features and techniques described herein may be applied to other parts having cooling circuits. For example, the cooling channels 180, and the inlet orifices 170 may be formed in the inner vane platform 112 and/or the outer vane platform 114 in FIG. 2.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of forming a blade outer air seal segment, comprising:
    depositing a blade outer air seal material around a core, the core being configured to define features of the blade outer air seal segment, the blade outer seal segment having:
    a radially outward surface;
    a radially inward surface oriented away from the radially outward surface, a radially outward wall interposed between the radially outward surface and the radially inward surface;
    a cooling channel located between the radially outward surface and the radially inward surface;
    a stress-relief boss extending into the cooling channel;

an inlet orifice fluidly coupled to the cooling channel through the stress-relief boss;
a stress-relief recess, the stress-relief boss being located within the stress-relief recess;
wherein the cooling channel is defined, at least partially, by a radially outward channel surface and a radially inward channel surface;
wherein the stress-relief boss extends away from the radially outward channel surface to a surface of the stress-relief boss;
wherein a thickness of the radially outward wall between the radially outward surface and the surface of the stress-relief boss is greater than a thickness of the radially outward wall between the radially outward surface and the radially outward channel surface, and wherein a radial height of the cooling channel at a base of the stress-relief recess is greater than any other radial height of the cooling channel.

2. The method as in claim 1, wherein the blade outer air seal segment further comprises:
a raised portion of the radially outward surface, wherein the radially outward channel surface is located radially outward of the radially inward channel surface, and wherein the inlet orifice extends from the raised portion of the radially outward surface to the surface of the stress-relief boss.

3. The method as in claim 1, wherein the surface of the stress-relief boss is parallel to at least one of the radially inward channel surface and the radially outward channel surface.

4. The method as in claim 1, wherein a radial height of the cooling channel between the radially outward channel surface and the radially inward channel surface is greater than a radial height of the cooling channel between the surface of the stress-relief boss and the radially inward channel surface.

5. The method as in claim 1, wherein the stress-relief boss is concentric to the inlet orifice.

6. The method as in claim 1, wherein the stress-relief boss is concentric to the stress-relief recess.

7. The method as in claim 1, wherein the stress-relief recess extends into the radially outward channel surface to the base of the stress-relief recess.

8. The method as in claim 7, wherein a radial height of the cooling channel between the radially outward channel surface and the radially inward channel surface is less than the radial height of the cooling channel between the base of the stress-relief recess and the radially inward channel surface.

9. The method as in claim 1, wherein the inlet orifice is formed using electrical discharge machining.

\* \* \* \* \*